United States Patent
Draeger

(10) Patent No.: US 12,029,212 B1
(45) Date of Patent: Jul. 9, 2024

(54) SCARECROW MOUNT

(71) Applicant: Dalen Products, Inc., Knoxville, TN (US)

(72) Inventor: William M. Draeger, Sevierville, TN (US)

(73) Assignee: Dalen Products, Inc., Knoxville, TN (US)

( * ) Notice: Subject to any disclaimer, the term of this patent is extended or adjusted under 35 U.S.C. 154(b) by 237 days.

(21) Appl. No.: 17/715,329

(22) Filed: Apr. 7, 2022

(51) Int. Cl.
*A01M 29/06* (2011.01)
*F16M 13/02* (2006.01)

(52) U.S. Cl.
CPC .......... *A01M 29/06* (2013.01); *F16M 13/02* (2013.01)

(58) Field of Classification Search
CPC ...... A01M 31/06; A01M 29/00; A01M 29/06; F16M 13/02
USPC ............. 43/1–3; 116/22 A; 52/101; 24/67 R, 24/67.3, 67.9, DIG. 8; 248/200, 205.1, 248/207, 214, 218.4, 219.1, 219.3, 229.1, 248/229.16, 229.17, 229.2, 229.26, 248/226.11, 228.1, 228.7, 228.8, 231.81, 248/231.85, 300, 309.1, 310, 316.1, 248/316.7, 316.8
See application file for complete search history.

(56) References Cited

U.S. PATENT DOCUMENTS

| | | | | |
|---|---|---|---|---|
| 466,932 A | * | 1/1892 | Cornell | A01G 17/06 248/214 |
| 990,856 A | * | 5/1911 | Freiberg | F16M 13/02 248/302 |
| 1,403,004 A | * | 1/1922 | Beckers | A47G 25/10 248/229.16 |
| 1,549,142 A | * | 8/1925 | McKenzie | A47K 10/14 248/300 |
| 2,006,843 A | * | 7/1935 | Russell | B43K 23/002 248/205.5 |
| 2,555,562 A | * | 6/1951 | Bales | A47B 57/58 24/581.1 |
| 2,575,252 A | * | 11/1951 | Berger | A01M 29/06 43/3 |

(Continued)

FOREIGN PATENT DOCUMENTS

| | | | |
|---|---|---|---|
| CN | 107494513 A | * | 12/2017 |
| JP | 2015100319 A | * | 6/2015 |

(Continued)

*Primary Examiner* — Darren W Ark
(74) *Attorney, Agent, or Firm* — Luedeka Neely, P.C.

(57) ABSTRACT

A scarecrow mount for mounting a scarecrow to a first support, the scarecrow having a hollow base with an aperture formed on a bottom of the hollow base. The scarecrow mount includes a first rigid leg of unitary construction and mountable to an upper surface of the first support and having a scarecrow holder formed thereon and configured for installation to the scarecrow through the aperture on the bottom of the scarecrow to engage the bottom of the scarecrow and apply a spring tension to hold the scarecrow on the leg. The scarecrow holder is configured as an elongate double curved member having a proximal end directly connected to the first leg and an opposite free end. The scarecrow holder is shaped to have an upward curve just outward of the proximal end and an oppositely extending downward curve just inward of the free end, such that the free end is angled upwardly away from the first leg.

4 Claims, 4 Drawing Sheets

(56) References Cited

U.S. PATENT DOCUMENTS

| | | | | |
|---|---|---|---|---|
| 2,576,209 A * | 11/1951 | Berger | A01M 29/06 | 43/3 |
| 2,582,514 A * | 1/1952 | Swisher | A01M 29/06 | 446/268 |
| 2,985,349 A * | 5/1961 | McGuire | B44D 3/14 | 224/907 |
| 3,116,742 A * | 1/1964 | Seckerson | A24F 19/14 | 248/231.81 |
| 3,131,447 A * | 5/1964 | Tinnerman | F16L 3/24 | 248/300 |
| 3,568,980 A * | 3/1971 | Hulburt | H01B 17/145 | 256/10 |
| 3,720,395 A * | 3/1973 | Schuplin | H02G 3/126 | 220/3.9 |
| 4,332,362 A * | 6/1982 | Leopold | G09F 1/14 | 248/447.2 |
| 4,362,284 A * | 12/1982 | Bolante | H02G 3/125 | 403/387 |
| 5,002,249 A * | 3/1991 | Meyer | A47F 7/147 | 24/67.11 |
| 5,901,491 A * | 5/1999 | Caldwell | A01M 31/06 | 43/2 |
| 6,581,891 B1 * | 6/2003 | Byrd | A47B 5/04 | 248/230.8 |
| 7,246,569 B2 * | 7/2007 | Grandy | A01M 29/06 | 340/573.2 |
| 7,255,060 B2 * | 8/2007 | Grandy | A01M 29/06 | 116/22 A |
| 7,409,793 B1 * | 8/2008 | Schwarz | A01M 31/06 | 43/3 |
| 7,458,114 B2 * | 12/2008 | Troutman | A47D 9/016 | 5/93.1 |
| 7,568,305 B2 * | 8/2009 | Fanfelle | A01M 31/06 | 248/908 |
| 8,136,288 B1 * | 3/2012 | Shope | A01M 31/06 | 43/2 |
| 9,072,288 B1 * | 7/2015 | Thomas | A01M 29/10 | |
| 10,412,955 B2 * | 9/2019 | Scherr | A01M 31/06 | |
| 10,435,882 B2 * | 10/2019 | Maney | F16B 5/06 | |
| 2003/0101545 A1 * | 6/2003 | Hsiao | B42F 1/02 | 24/67.9 |
| 2004/0045137 A1 * | 3/2004 | Hsiao | B42F 1/02 | 24/67.9 |
| 2005/0252067 A1 * | 11/2005 | Wade | A01M 31/06 | 43/3 |
| 2005/0268522 A1 * | 12/2005 | Foster | A01M 31/06 | 43/3 |
| 2006/0119482 A1 * | 6/2006 | Hanscom | A01M 31/002 | 340/573.1 |
| 2008/0178512 A1 * | 7/2008 | Lessmann | A01M 31/06 | 43/3 |
| 2008/0184460 A1 * | 8/2008 | Jones | A41B 15/02 | 24/67 R |
| 2008/0210153 A1 * | 9/2008 | Alvarado | A01M 29/06 | 340/573.2 |
| 2008/0256838 A1 * | 10/2008 | Fanfelle | A01M 31/06 | 43/2 |
| 2009/0126253 A1 * | 5/2009 | Wood | A01M 31/06 | 29/469 |
| 2010/0078101 A1 * | 4/2010 | Styron | A45C 1/06 | 150/147 |
| 2013/0042544 A1 * | 2/2013 | Sabine | A01M 31/06 | 52/101 |
| 2014/0060419 A1 * | 3/2014 | Gardner | A01M 29/18 | 116/22 A |
| 2015/0027028 A1 * | 1/2015 | Steinberg | A01M 31/06 | 43/2 |
| 2015/0059936 A1 * | 3/2015 | Singer | A45C 13/023 | 442/131 |
| 2015/0211677 A1 * | 7/2015 | Driscoll | F16M 13/022 | 248/205.1 |
| 2015/0258841 A1 * | 9/2015 | Briganti | B42F 9/002 | 24/329 |
| 2015/0308613 A1 * | 10/2015 | Callif | A47G 1/20 | 248/216.1 |
| 2016/0113428 A1 * | 4/2016 | Weaver | A47H 1/142 | 248/262 |
| 2016/0309704 A1 * | 10/2016 | Young | A01M 31/06 | |
| 2017/0273296 A1 * | 9/2017 | Scherr | A01M 31/06 | |
| 2018/0125062 A1 * | 5/2018 | Brooks | F16M 13/02 | |
| 2020/0146279 A1 * | 5/2020 | Young | A01M 31/06 | |
| 2022/0338462 A1 * | 10/2022 | Kohler | A01M 29/10 | |

FOREIGN PATENT DOCUMENTS

| | | | | |
|---|---|---|---|---|
| KR | 20110008953 U | * | 9/2011 | |
| KR | 101481917 B1 | * | 1/2015 | |
| WO | WO-2008051685 A2 | * | 5/2008 | A01M 29/06 |

* cited by examiner

SCARECROW MOUNT

FIELD

This disclosure relates to the field of mounts. More particularly, this disclosure relates to a mount configured for use in mounting scarecrows and, in particular, small plastic scarecrows for gardens in the nature of plastic owls and the like.

BACKGROUND

Scarecrows, such as plastic owls, hawks, and the like are effective at deterring birds, bats, rabbits, and the like from gardens, flower beds, porches, and the like. In using such scarecrows, improvement is desired in the positioning of scarecrows in an elevated location to resemble a natural perching location for owls, hawks, and the like, and securing the scarecrow from being blown over from wind, rain, and the like.

The present disclosure provides an improved mount configured for use in mounting scarecrows and, in particular, small plastic scarecrows for gardens in the nature of plastic owls and the like.

SUMMARY

The above and other needs are met by an improved scarecrow mount for mounting a scarecrow to a first support, the scarecrow having a hollow base with an aperture formed on a bottom of the hollow base.

In one aspect, the scarecrow mount includes a first rigid leg of unitary construction and mountable to an upper surface of the first support and having a scarecrow holder formed thereon and configured for installation to the scarecrow through the aperture on the bottom of the scarecrow to engage the bottom of the scarecrow and apply a spring tension to hold the scarecrow on the leg. The scarecrow holder is configured as an elongate double curved member having a proximal end directly connected to the first leg and an opposite free end. The scarecrow holder is shaped to have an upward curve just outward of the proximal end and an oppositely extending downward curve just inward of the free end, such that the free end is angled upwardly away from the first leg.

The disclosure also provides a scarecrow and mount system for mounting the scarecrow to a first support In one aspect, the system includes a scarecrow having a hollow base with an aperture formed on a bottom of the hollow base and a scarecrow mount.

The scarecrow mount includes a first rigid leg of unitary construction and mountable to an upper surface of the first support and having a scarecrow holder formed thereon and configured for installation to the scarecrow through the aperture on the bottom of the scarecrow to engage the bottom of the scarecrow and apply a spring tension to hold the scarecrow on the leg.

The scarecrow holder is configured as an elongate double curved member having a proximal end directly connected to the first leg and an opposite free end. The scarecrow holder is shaped to have an upward curve just outward of the proximal end and an oppositely extending downward curve just inward of the free end, such that the free end is angled upwardly away from the first leg.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
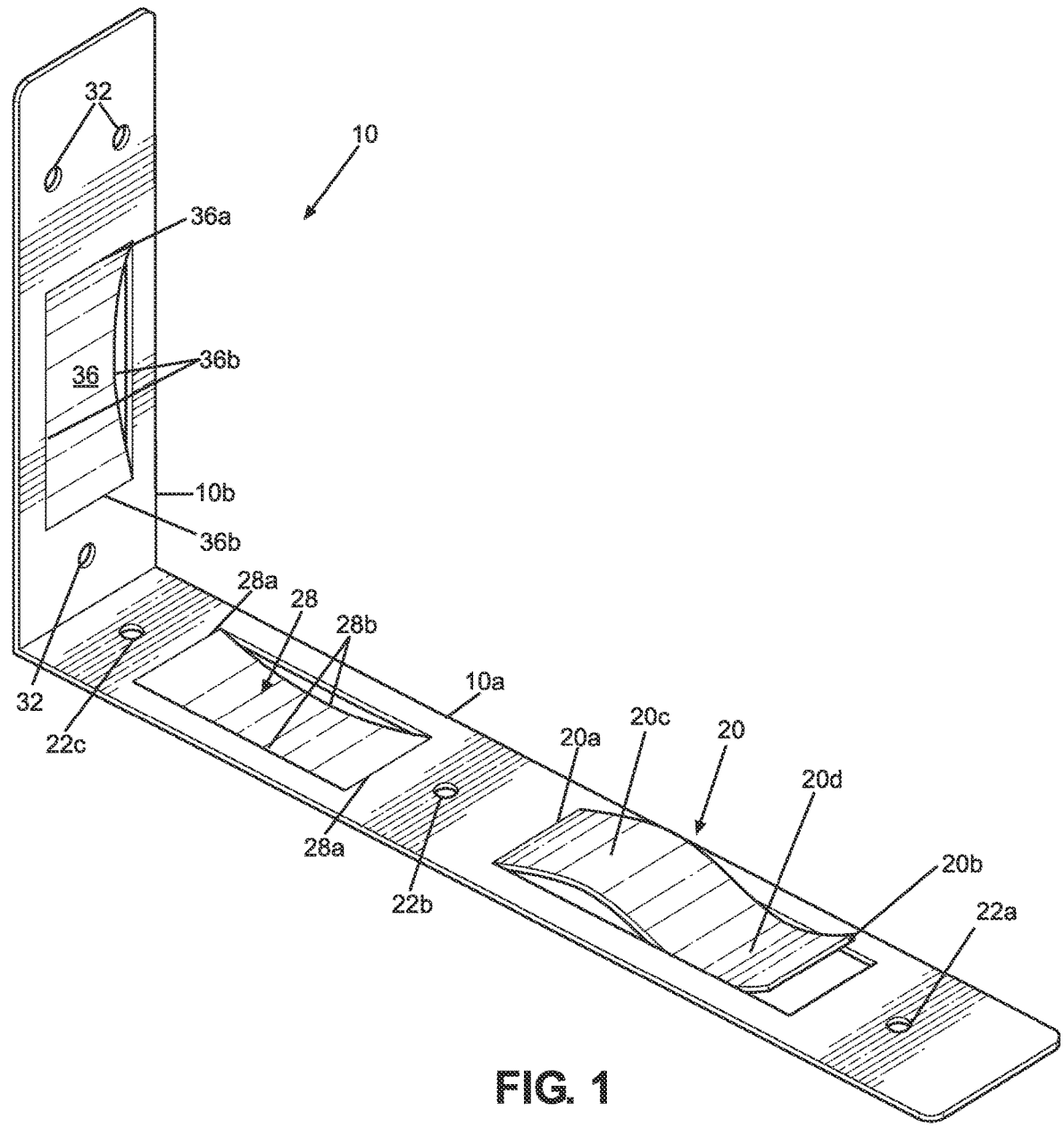
FIG. 1 is a perspective view of a mount according to the disclosure.
Figure 2:
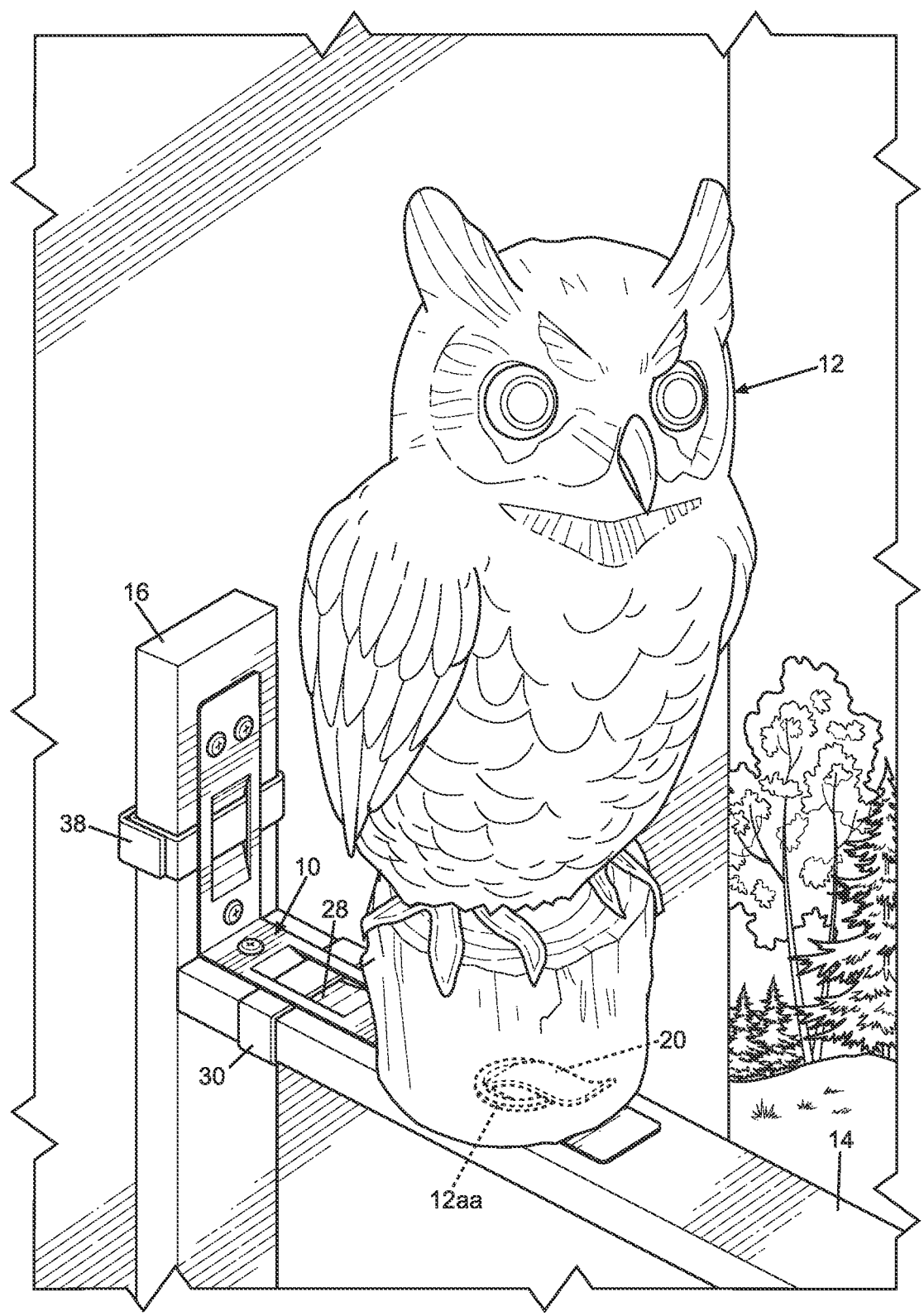
FIG. 2 shows the mount in use secured to a support structure and having a scarecrow installed thereon.
Figure 3:
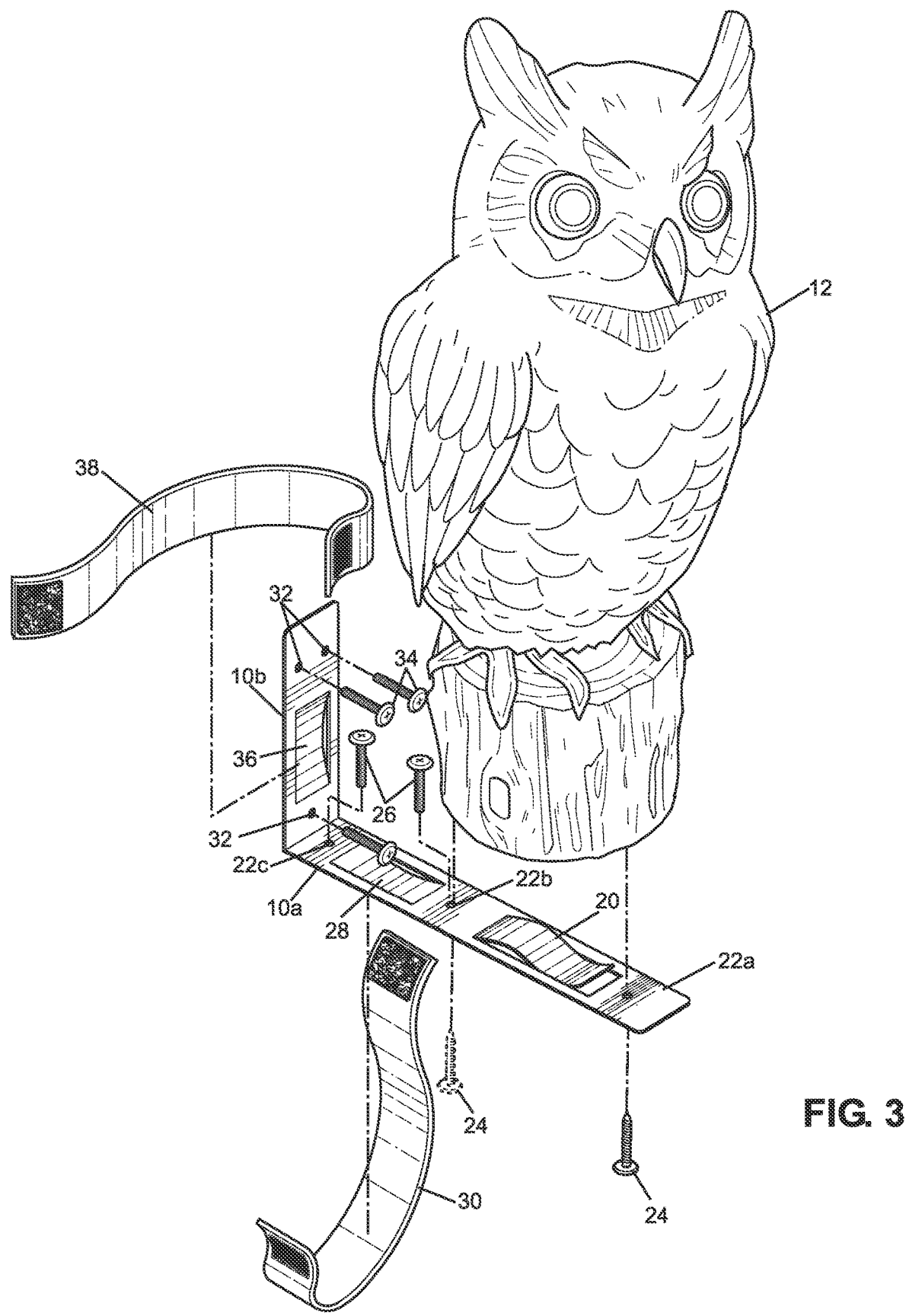
FIG. 3 is an exploded view of FIG. 3.
Figure 4:
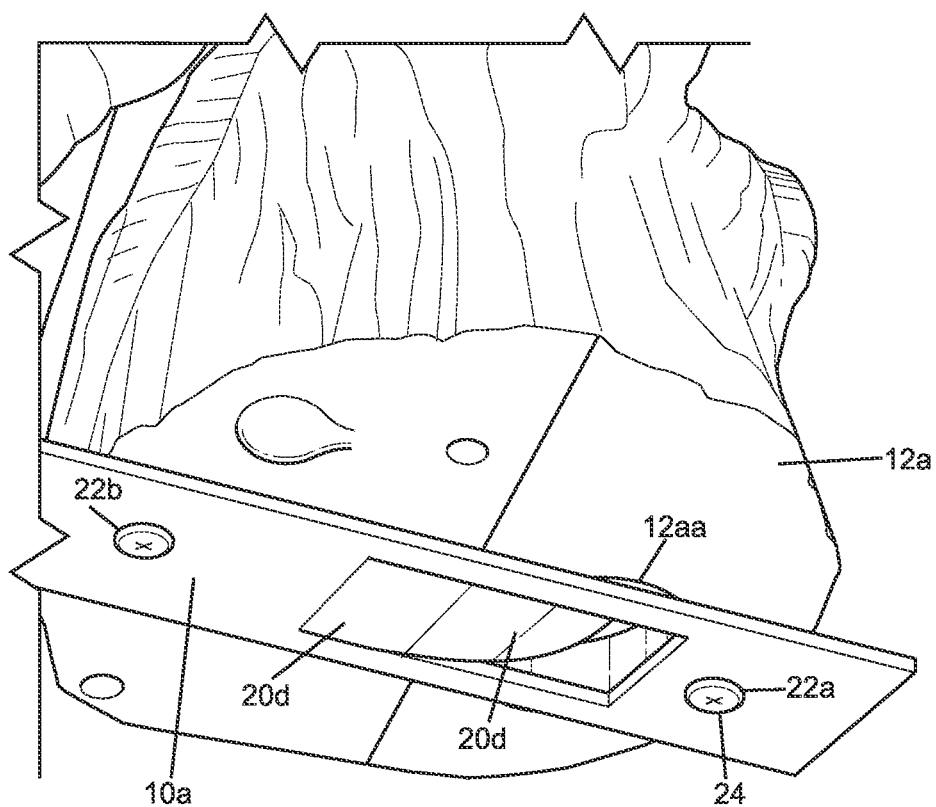
FIG. 4 shows the bottom of the scarecrow installed onto the mount.

With reference to the drawings, there is shown a scarecrow mount 10 according to the disclosure. The mount 10 is configured especially for mounting a plastic scarecrow 12 such as a plastic owl as shown. However, it will be utilized for mounting other types of scarecrows and structures. The mount 10 is also configured to be ornamental in appearance and aesthetically pleasing.

The scarecrow 12 is desirably one of the blow-molded plastic scarecrows available from Dalen Products, Inc. under the trademark NATURAL ENEMY SCARECROW. Such scarecrows are of hollow-body construction having a base with a bottom surface 12a provided with an aperture 12aa in the form of a circle having a diameter of about 1.75 inches.

The mount 10 is of unitary construction and is generally L-shaped to have a lateral rigid leg 10a and an rigid upright leg 10b. The leg 10a is configured for mounting of the scarecrow 12 thereto. The leg 10a is also configured for mounting of the mount 10 to a support 14, such as a rail of a porch or the like. The leg 10b is configured for mounting of the mount 10 to a support 16, such as a post or the like. The mount 10 may be formed of thin metal, or may be of plastic construction. The mount 10 may be formed by 3D-printing if desired.

As will be noted, the preferred mounting attitude of the scarecrow 12 is generally upright, such as an owl or the like would appear sitting on a rail or tree limb or the like. However, the scarecrow 12 could be mounted at other attitudes if desired and a support corresponding to such attitude is available. If only a single support is needed and the support is aligned with the leg 10a, the upright leg 10b may be omitted or removed.

The leg 10a includes a scarecrow holder 20 configured for installation through the aperture 12aa located on the bottom 12a of the scarecrow 12 to engage the bottom 12a of the scarecrow 12 and apply a spring tension to hold the scarecrow 12 on the leg 12a. The holder 20 is configured as an elongate double curved member having a proximal end 20a connected to the leg 10a and an opposite free end 20b. The holder 20 is shaped to have an upward curve 20c just outward of the proximal end 20a and an oppositely extending downward curve 20d just inward of the free end 20b, such that the free end 20b is angled upwardly away from the leg 10a.

The upward orientation of the free end 20b facilitates insertion of the holder 20 into the aperture 20aa. The curves 20c and 20d cooperate such that when the holder 20 is installed through the aperture 12aa, the lowermost surface of the curve 20c is yieldably tensioned in the manner of a spring against the inside of the bottom 20a. Thus, the holder 20 applies a downward force to the bottom 12a of the scarecrow 12 to hold the scarecrow 12 on the leg 12a, yet enables the scarecrow 12 to be easily removed if desired. The holder 20 also has desirable aesthetics.

The leg 10a may also include apertures 22a and 22b located for passage of screws 24 or other fasteners for further securing into the bottom 12a of the scarecrow 12. The apertures 22a and 22b may alternatively be used to secure screws 26 or other fasteners into the support 14. An additional aperture 22c is also provided to secure one of the screws 26 into the support 14.

The leg 10a also includes a strap holder 28 configured as a downwardly curved member connected at its ends 28a to the leg 10a and unconnected along its sides 28b. A strap 30 may be passed over the sides 28b and around the support 14 to secure the leg 10a to the support 14. The strap 30 is adjustably securable around the support 14 and may have mating hook and loop material, or include other closure structures such as a buckle or the like to enable adjustable securement about the support 14.

The leg 10b includes apertures 32 for passage of screws 34 or other fasteners to secure the leg 10b to the support 16. The leg 10b also includes a strap holder 36 configured as a downwardly curved member connected at its ends 36a to the leg 10b and unconnected along its sides 36b. A strap 38 may be passed over the sides 36b and around the support 16 to secure the leg 10b to the support 16. The strap 38 is adjustably securable around the support 16 and may have mating hook and loop material, or include other closure structures such as a buckle or the like to enable adjustable securement about the support 16.

Accordingly, it will be appreciated that the disclosure advantageously provides an improved configured especially for mounting a plastic scarecrow, such as a plastic owl and similar structures having a base with an aperture therein. The mount as shown herein is also configured to be ornamental in appearance and aesthetically pleasing.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A scarecrow and mount system for mounting the scarecrow to a support, the system comprising:
    a scarecrow having a hollow base with an aperture formed on a bottom of the hollow base; and
    a scarecrow mount comprising a first rigid leg of unitary construction and mountable to an upper surface of a first support and having a scarecrow holder formed thereon and configured for installation to the scarecrow through the aperture on the bottom of the scarecrow to engage the bottom of the scarecrow and apply a spring tension to hold the scarecrow on the first leg, the scarecrow holder being configured as an elongate double curved member having a proximal end directly connected to the first leg and an opposite free end, the scarecrow holder being shaped to have an upward curve just outward of the proximal end and an oppositely extending downward curve just inward of the free end, such that the free end is angled upwardly away from the first leg.

2. The system of claim 1, wherein the first leg includes one or more fastener apertures formed therethrough for passage of fasteners.

3. The system of claim 1, further comprising a strap holder formed on the first leg, the strap holder comprising a downwardly curved member connected at ends thereof to the first leg and unconnected along sides thereof to the first leg.

4. The system of claim 1, further comprising a second rigid leg extending generally perpendicular from an end of the first rigid leg, the second rigid leg being mountable to a second support.

* * * * *